United States Patent
Khatri

(10) Patent No.: US 7,882,333 B2
(45) Date of Patent: Feb. 1, 2011

(54) ARCHITECTURAL ENHANCEMENTS TO CPU MICROCODE LOAD MECHANISM USING INTER PROCESSOR INTERRUPT MESSAGES

(75) Inventor: Mukund Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 385 days.

(21) Appl. No.: 11/934,821

(22) Filed: Nov. 5, 2007

(65) Prior Publication Data

US 2009/0119495 A1 May 7, 2009

(51) Int. Cl.
*G06F 15/76* (2006.01)
*G06F 15/177* (2006.01)

(52) U.S. Cl. ............ 712/16; 712/22; 713/2

(58) Field of Classification Search .......... 712/16; 713/2
See application file for complete search history.

(56) References Cited

U.S. PATENT DOCUMENTS

| | | | |
|---|---|---|---|
| 6,158,000 A * | 12/2000 | Collins | 713/1 |
| 6,339,788 B1 | 1/2002 | Geyer et al. | |
| 6,684,395 B2 | 1/2004 | Johnson et al. | |
| 6,928,539 B2 * | 8/2005 | Brassac et al. | 713/1 |
| 7,398,380 B1 * | 7/2008 | Lovett et al. | 713/1 |
| 7,610,481 B2 * | 10/2009 | Cool et al. | 713/2 |
| 2004/0107416 A1 * | 6/2004 | Buban et al. | 717/170 |
| 2008/0162873 A1 * | 7/2008 | Zimmer et al. | 712/22 |
| 2009/0037932 A1 * | 2/2009 | Clark et al. | 719/315 |

OTHER PUBLICATIONS

Sidney Cammeresi, "Bringing SMP to Your UP Operating System", Apr. 30, 2006.*

* cited by examiner

*Primary Examiner*—Eddie P Chan
*Assistant Examiner*—William B Partridge
(74) *Attorney, Agent, or Firm*—Hamilton & Terrile, LLP; Stephen A. Terrile

(57) ABSTRACT

A method for loading microcode to a plurality of cores within a processor. The method includes loading the microcode to a first core of the plurality of cores within the processor system and generating a broadcast inter process interrupt (IPI) message via the first core. The IPI message causes other cores within the processor system to synchronize respective microcode with the microcode that is loaded into the first core. The synchronizing loads microcode to the plurality of cores without requiring independent loads of microcode to each core.

12 Claims, 3 Drawing Sheets

ARCHITECTURAL ENHANCEMENTS TO CPU MICROCODE LOAD MECHANISM USING INTER PROCESSOR INTERRUPT MESSAGES

BACKGROUND OF THE INVENTION

1. Field of the Invention

The present invention relates to information handling systems and more particularly to enhancements to processor microcode load mechanisms for information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems with processors which include a plurality of processor cores. In certain known processor architectures, on each power-up, the basic input output system (BIOS) of the information handling system can be required to load processor microcode, separately to each core, before multi-level caches can be enabled. To load microcode patches (such as during a power on self test (POST) operation), the BIOS wakes up each non-boot strap processor (BSP) core (i.e., all of the cores of the processor other than the boot processor core) and then loads microcode and then enable cache on each of the application processor cores (i.e., the non-BSP cores). As the number of cores in each socket increases, this process increases the amount of resume time required to perform power on self test.

In certain multicore processor architectures, the overhead, especially during an S3 state resume process, for microcode load or multiprocessor initialization, can be due to all the bus cycles from all of the application processors (APs) to fetch the code and data, and looping around semaphores for synchronizing amongst various application processors.

It is known to provide processors with identical cores in each of the processor sockets. Additionally, the number of cores continues to increase (e.g., known processors can include four cores, but this number is quickly increasing to eight, and potentially more thereafter). With identical cores, each of the plurality of cores require substantially the same microcode. Thus, an increase in the number of cores within an information handling system presents a corresponding increase in the amount of time required to wake up each of the cores and load microcode to the core.

Accordingly, it is desirable to provide an information handling system with a more efficient mechanism for loading microcode to a plurality of identical cores.

SUMMARY OF THE INVENTION

In accordance with the present invention an information handling system is provided with an efficient mechanism for loading microcode to a plurality of identical cores.

More specifically, in one embodiment, the invention relates to a method for loading microcode to a plurality of cores within a processor system which includes loading the microcode to a first core of the plurality of cores within the processor system, generating a broadcast inter process interrupt (IPI) message via the first core wherein the IPI message causes other cores within the processor system to synchronize respective microcode with the microcode that is loaded into the first core and the synchronization loads microcode to the plurality of cores without requiring independent loads of microcode to each core.

In another embodiment, the invention relates to an apparatus method for loading microcode to a plurality of cores within a processor system which includes means for loading the microcode to a first core of the plurality of cores within the processor system, means for generating a broadcast inter process interrupt (IPI) message via the first core wherein the IPI message causes other cores within the processor system to synchronize respective microcode with the microcode that is loaded into the first core and the synchronization loads microcode to the plurality of cores without requiring independent loads of microcode to each core.

In another embodiment, the invention relates to an information handling system which includes a processor system and a memory coupled to the processor system. The processor system comprises a plurality of processor cores. The memory stores a microcode load module for loading microcode to the plurality of cores within a processor system. The microcode load module comprises instructions for loading the microcode to a first core of the plurality of cores within the processor system, generating a broadcast inter process interrupt (IPI) message via the first core wherein the IPI message causes other cores within the processor system to synchronize respective microcode with the microcode that is loaded into the first core and the synchronization loads microcode to the plurality of cores without requiring independent loads of microcode to each core.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
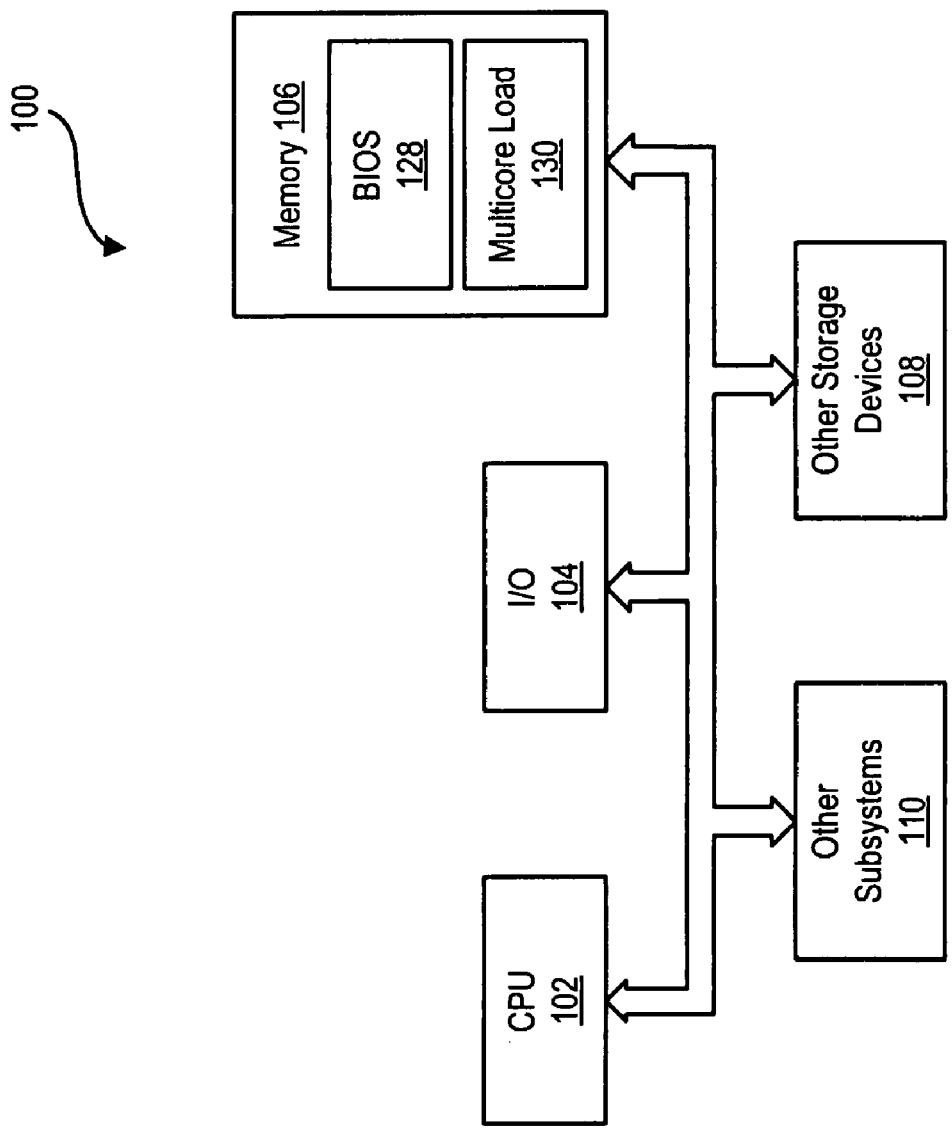
FIG. 1 shows a system block diagram of an information handling system.

Referring briefly to FIG. 1, a system block diagram of an information handling system 100 is shown. The information handling system 100 includes a processor system 102, input/output (I/O) devices 104, such as a display, a keyboard, a mouse, and associated controllers, memory 106, including volatile memory such as random access memory (RAM) and non-volatile memory such as read only memory (ROM) and hard disk drives, and other storage devices 108, such as a floppy disk and drive or CD-ROM disk and drive, and various other subsystems 110, all interconnected via one or more buses 112. The memory 106 includes a basic input output system 128 as well as a multicore load module 130. The multicore load module 130 enables efficient loading microcode to a plurality of identical cores.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
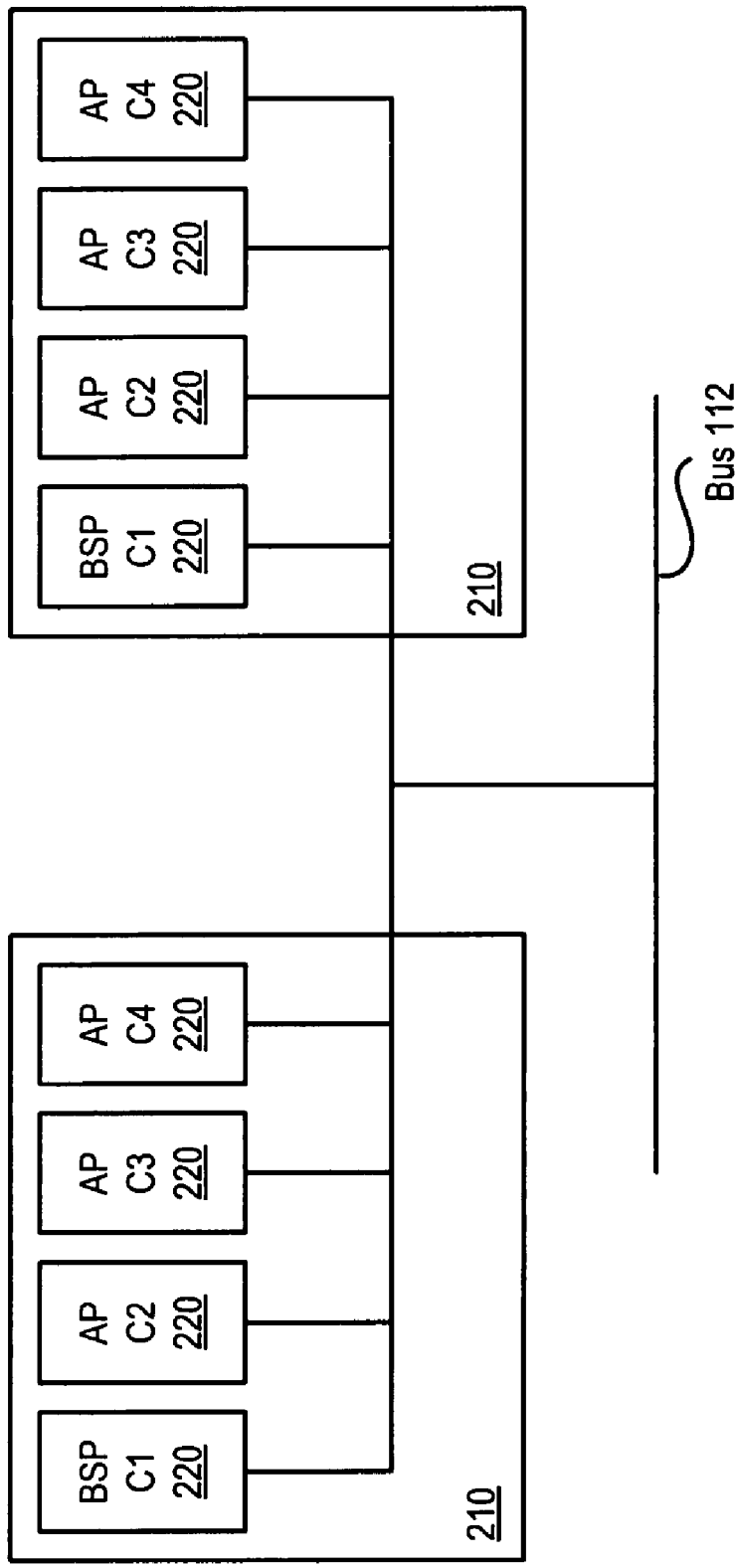
FIG. 2 shows a block diagram of an example processor system.

Referring to FIG. 2, the processor system 102 includes a plurality of processors 210 (which may be coupled to the bus 112 of the information handling system via respective processor sockets), where each processor 210 includes a plurality of processor cores 220. Within each processor 210, one of the processor cores 220 functions as a boot strap processor (BSP) (e.g., core 1 (C1)) while the other cores 220 function as application processors (AP) (e.g., cores 2-4 (C2-C4)).

Figure 3:
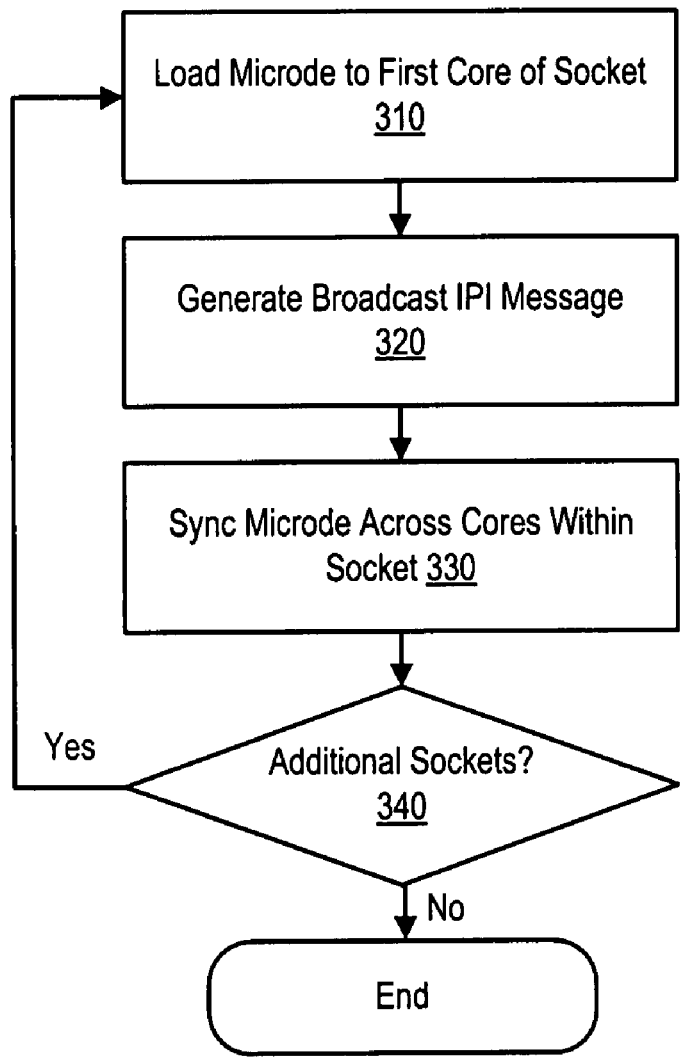
FIG. 3 shows a flow chart of the operation of a system for loading microcode to a plurality of processor cores.

Referring to FIG. 3, a flow chart of the operation of the multicore load module 130 is shown. The multicore load module 130 loads microcode into a first core and then broadcasts an inter processor interrupt (IPI) to other cores within the processor system 102 to perform a synchronization operation without requiring independent loads of microcode to each core.

More specifically, in the multicore load module 130 first loads microcode to the a first core (e.g., to a boot strap processor (BSP) core 230) in each processor 210 at step 310. Next the multicore load module 120 issues a broadcast inter process interrupt (IPI) message at step 320. The IPI message causes the other cores within the processor 210 to synchronize their respective microcode with the microcode that is loaded into the BSP core at step 340. Next, the multicore load module 130 determines whether additional processors are present within the processor system 102 at step 340. If additional processors are present, then the multicore load module 120 returns to step 310 to load the microcode to the first core of the additional processor and proceeds to issue a broadcast IPI message across the cores of this additional processor at step 320.

The IPI message is internal to the particular processor and thus does not need to extend beyond the processor. Thus, by using the IPI message, the BIOS 128 only needs to load microcode to one core per processor rather than loading the microcode individually to each of the cores of the processor. Thus by using the IPI message to broadcast the microcode across the plurality of processor cores, the time needed to load the microcode is reduced and essential task during this UNCACHED run of these processors.

Thus, the multicore load module 130 drastically simplifies firmware and operating system requirements for multicore processor systems. The multicore load module 130 also reduces the time associated with boot up of the processors, such as during an S3 boot up operation. The multicore load module 130 also simplifies the BIOS 128 due to abstraction of many of the details that are related to processor model specific modifications to the BIOS. For example, these modifications can relate to hyper-threading vs. non-hyperthreading type of modifications. Without the multicore load module 130, the BIOS 128 might be required to manage these types of modifications as processors change (e.g., by processor vendors defining new cores or changing the behavior on existing cores via new revisions to the processors).

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, while the multicore load module 130 is described with reference loading microcode across a plurality of processor cores, it will be appreciated that such an IPI operation may be used to synchronize machine specific registers (MSRs) within each of the cores as well as memory type range registers (MTRRs) within each of the cores of a particular processor. Additionally, by using this method for MSRs and MTRRs, the burden on BIOS 128 to ensure that the MSRs and MTRRs are in harmony across the cores (or even across a plurality of logical processors). Thus, such a method reduces the requirement that this synchronization occur multiple times during POST and as well as the requirement that the BIOS be updated as new processor core designs are introduced.

Also, for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for loading microcode to a plurality of cores within a processor system comprising:
   loading the microcode to a boot strap processor (BSP) core of the plurality of cores within the processor system;
   generating a broadcast inter processor interrupt (IPI) message via the first core, the IPI message causing other cores within the processor system to synchronize their respective microcode with the microcode that is loaded into the BSP core, the synchronizing loading microcode to the plurality of cores without requiring independent loads of microcode to each core.

2. The method of claim 1, further comprising:
   determining whether an additional processor is present within the processor system, where the additional processor comprises a plurality of processor cores; and, if an additional processor is present, then
   loading the microcode to a boot strap processor (BSP) core of the additional processor; and generating a broadcast IPI message via the BSP core of the additional processor.

3. The method of claim 1, wherein:
   the other cores of the plurality of cores comprise application processor (AP) cores.

4. The method of claim 1, further comprising:
   synchronizing machine specific register (MSR) information, and memory type range register (MTRR) information via the broadcast IPI message.

5. An apparatus for loading microcode to a plurality of cores within a processor system comprising:
   means for loading the microcode to a boot strap processor (BSP) core of the plurality of cores within the processor system;
   means for generating a broadcast inter processor interrupt (IPI) message via the first core, the IPI message causing other cores within the processor system to synchronize their respective microcode with the microcode that is loaded into the BSP core, the synchronizing loading microcode to the plurality of cores without requiring independent loads of microcode to each core.

6. The apparatus of claim 5, further comprising:
   means for determining whether an additional processor is present within the processor system, where the additional processor comprises a plurality of processor cores; and, if an additional processor is present, then
   means for loading the microcode to a boot strap processor (BSP) core of the additional processor; and
   means for generating a broadcast IPI message via the BSP core of the additional processor.

7. The apparatus of claim 5, wherein:
   the other cores of the plurality of cores comprise application processor (AP) cores.

8. The apparatus of claim 5, further comprising:
   means for synchronizing machine specific register (MSR) information and memory type range register (MTRR) information via the broadcast IPI message.

9. An information handling system comprising:
   a processor system, the processor system comprising a plurality of processor cores; and,
   a memory coupled to the processor system, the memory storing a microcode load module for loading microcode to the plurality of cores within a processor system, the microcode load module comprising instructions for:
      loading the microcode to a boot strap processor (BSP) core of the plurality of cores within the processor system;
      generating a broadcast inter processor interrupt (IPI) message via the first core, the IPI message causing other cores within the processor system to synchronize their respective microcode with the microcode that is loaded into the BSP core, the synchronizing loading microcode to the plurality of cores without requiring independent loads of microcode to each core.

10. The information handling system of claim 9 wherein the microcode load module further comprises instructions for:
    determining whether an additional processors is present within the processor system, where the additional processor comprises a plurality of processor cores; and, if an additional processor is present, then
    loading the microcode to a boot strap processor (BSP) core of the additional processor; and
    generating a broadcast IPI message via the BSP core of the additional processor.

11. The information handling system of claim 9, wherein:
    the other cores of the plurality of cores comprise application processor (AP) cores.

12. The information handling system of claim 9, wherein the instructions further comprise instructions for:
    synchronizing machine specific register (MSR) information, and memory type range register (MTRR) information via the broadcast IPI message.

* * * * *